United States Patent
Green et al.

(10) Patent No.: US 8,245,229 B2
(45) Date of Patent: Aug. 14, 2012

(54) TEMPORAL BATCHING OF I/O JOBS

(75) Inventors: Dustin L. Green, Redmond, WA (US);
Yau Ning Chin, Seattle, WA (US);
Bruce L. Worthington, Redmond, WA (US); Shuvabrata Ganguly, Seattle, WA (US); Pankaj Garg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 12/242,615

(22) Filed: Sep. 30, 2008

(65) Prior Publication Data

US 2010/0083256 A1    Apr. 1, 2010

(51) Int. Cl.
*G06F 9/445* (2006.01)

(52) U.S. Cl. .................................. 718/101; 718/102

(58) Field of Classification Search .................. None
See application file for complete search history.

(56) References Cited

U.S. PATENT DOCUMENTS

| | | | |
|---|---|---|---|
| 5,175,679 A * | 12/1992 | Allen et al. | ............... 700/28 |
| 5,179,702 A | 1/1993 | Spix et al. | |
| 5,313,584 A | 5/1994 | Tickner et al. | |
| 5,467,268 A | 11/1995 | Sisley et al. | |
| 5,535,418 A | 7/1996 | Suzuki | |
| 5,655,120 A * | 8/1997 | Witte et al. | ............... 718/105 |
| 5,948,081 A | 9/1999 | Foster | |
| 5,978,560 A | 11/1999 | Tan et al. | |
| 6,032,200 A * | 2/2000 | Lin | .................. 710/6 |
| 6,272,565 B1 | 8/2001 | Lamberts | |
| 6,292,856 B1 | 9/2001 | Marcotte | |
| 6,353,844 B1 | 3/2002 | Bitar et al. | ............... 709/102 |
| 6,356,917 B1 * | 3/2002 | Dempsey et al. | ............... 1/1 |
| 6,557,055 B1 | 4/2003 | Wiese | |
| 6,751,684 B2 | 6/2004 | Owen et al. | |
| 6,877,049 B1 | 4/2005 | Myers | |
| 6,930,795 B1 | 8/2005 | Motamed et al. | |
| 6,971,097 B1 * | 11/2005 | Wallman | ............... 718/101 |
| 7,080,146 B2 | 7/2006 | Bradford et al. | |
| 7,162,550 B2 | 1/2007 | Douglas | |
| 7,165,252 B1 | 1/2007 | Xu | |
| 7,167,916 B2 | 1/2007 | Willen et al. | |
| 7,197,749 B2 | 3/2007 | Thornton et al. | ............... 718/101 |
| 7,225,293 B2 | 5/2007 | Lamberts | |
| 7,353,514 B1 | 4/2008 | Camp et al. | ............... 718/101 |
| 7,441,244 B2 | 10/2008 | Longobardi | |

(Continued)

OTHER PUBLICATIONS

Coleman, "Batch Tuning: Do More in Less Time," http://ibmsystemsmag.blogs.com/db2utor/2008/06/batch-tuning-do.html, downloaded 2008, 3 pages.

(Continued)

*Primary Examiner* — Eric Coleman
(74) *Attorney, Agent, or Firm* — Woodcock Washburn LLP

(57) ABSTRACT

Batching techniques are provided to maximize the throughput of a hardware device based on the saturation point of the hardware device. A balancer can determine the saturation point of the hardware device and determine the estimated time cost for IO jobs pending in the hardware device. A comparison can be made and if the estimated time cost total is lower than the saturation point one or more IO jobs can be sent to the hardware device.

20 Claims, 12 Drawing Sheets

U.S. PATENT DOCUMENTS

| | | |
|---|---|---|
| 7,444,638 B1 | 10/2008 | Xu |
| 7,698,530 B2 | 4/2010 | Flemming et al. |
| 7,707,578 B1 | 4/2010 | Zedlewski et al. |
| 2003/0149717 A1 | 8/2003 | Heinzman .............. 709/101 |
| 2004/0143687 A1 | 7/2004 | Cox |
| 2004/0237087 A1 | 11/2004 | Ye et al. .............. 718/101 |
| 2005/0015767 A1 | 1/2005 | Nash et al. |
| 2005/0060704 A1* | 3/2005 | Bulson et al. .............. 718/1 |
| 2005/0144332 A1* | 6/2005 | Nellitheertha .............. 710/15 |
| 2006/0037018 A1* | 2/2006 | Fang et al. .............. 718/100 |
| 2006/0045139 A1 | 3/2006 | Black et al. |
| 2006/0182030 A1 | 8/2006 | Harris et al. |
| 2006/0187970 A1 | 8/2006 | Lee et al. |
| 2006/0242648 A1* | 10/2006 | Guccione et al. .............. 718/105 |
| 2007/0016907 A1 | 1/2007 | Benedetti et al. |
| 2007/0206645 A1 | 9/2007 | Sundqvist et al. |
| 2007/0220516 A1 | 9/2007 | Ishiguro et al. .............. 718/101 |
| 2007/0288224 A1* | 12/2007 | Sundarrajan et al. .............. 703/22 |
| 2008/0016508 A1* | 1/2008 | Goto et al. .............. 718/102 |
| 2008/0022280 A1 | 1/2008 | Cherkasova et al. |
| 2008/0046609 A1 | 2/2008 | Shum et al. |
| 2008/0052712 A1 | 2/2008 | Gustafson et al. .............. 718/101 |
| 2008/0066070 A1* | 3/2008 | Markov .............. 718/103 |
| 2008/0086733 A1* | 4/2008 | Jensen et al. .............. 718/102 |
| 2008/0155087 A1 | 6/2008 | Blouin et al. |
| 2008/0172441 A1 | 7/2008 | Speicher et al. |
| 2008/0209425 A1 | 8/2008 | Ferris |

OTHER PUBLICATIONS

Khanna, et al., "A Hypergraph Partitioning Based Approach for Scheduling of Tasks with Batch-Shared I/O," ftp://ftp.cse.ohio-state.edu/pub/tech-report/2004/TR56.pdf , downloaded 2008, 20 pages.

Lee, et al., "Implications of I/O for Gang Scheduled Workloads," https://netfiles.uiuc.edu/mif/www/pubs/Lee-1997-IPPS.pdf , downloaded 2008, 12 pages.

Leung, "Scalable Security for High Performance, Petascale Storage," http://www.ssrc.ucsc.edu/Papers/ssrctr-07-07.pdf , downloaded 2008, 23 pages.

Sugerman, et al., "Virtualizing I/O Devices on VMware Workstation's Hosted Virtual Machine Monitor," http://www.usenix.org/event/usenix01/sugerman/sugerman.ps , downloaded 2008, 14 pages.

"Print Spooler and Print Spooling Software", http://www.plustechnologies.com/PrintSpooler.aspx, accessed Jul. 21, 2008, 3 pages.

Schmookler et al., "A Low-power, High-speed Implementation of a PowerPC™ Microprocessor Vector Extension", Proceedings 14th IEEE Symposium on Computer Arithmetic, Apr. 14-16, 1999, 8 pages.

Sundararajan et al., "A modification to RED AQM for CIOQ switches", Globecom '04. IEEE—Global Telecommunications Conference, Nov. 29-Dec. 3, 2004, 3, 1708-1712.

* cited by examiner

TEMPORAL BATCHING OF I/O JOBS

CROSS REFERENCE TO RELATED APPLICATIONS

This application is related to U.S. application Ser. No. 12/242,621 entitled "HARDWARE THROUGHPUT SATURATION DETECTION" filed Sep. 30, 2008 and incorporated by reference in its entirety; and U.S. application Ser. No. 12/242,624 entitled "BALANCING USAGE OF HARDWARE DEVICES AMONG CLIENTS" filed Sep. 30, 2008 and incorporated by reference in its entirety.

BACKGROUND

Virtualization provides techniques for consolidating physical machines. That is, multiple virtual machines can be executed by a single physical machine. When servers are consolidated, a problem exists in how the virtual machines access the physical hardware. For example, if 5 virtual machines are effectuated by software instructions each one of them may attempt to access a physical hardware device such as a storage device, network adaptor, etc. The hardware device many not be able to efficiently support this many requesters and one or more of the virtual machines may experience resource starvation, e.g., the instance where the virtual machine is denied resources and its requests experience high latency. This is due to the fact that hardware devices are not configured to process information that identifies which IO jobs are from which virtual machine. The hardware device of course does not select IO jobs to complete in an arbitrary order, it selects IO jobs to maximize throughput and because of this certain IO jobs may sit in the device's buffer for an unacceptable length of time. For example, a driver for a hardware device such as a storage device may complete 200 IO jobs from a first virtual machine before completing 8 IO jobs from a second virtual machine because completing the 200 IO jobs may allow the hardware device to achieve higher throughput than if it completed the 8 IO jobs. One solution to eliminate resource starvation would be to limit the IO jobs that the driver can select buy sending IO jobs to the hardware one at a time. This technique implemented naively would severely impact throughput. That is, by hand picking each IO job the hardware device would not be able to reach its throughput potential. Thus, techniques for balancing throughput vs. resource starvation are desirable.

SUMMARY

An example embodiment of the present disclosure describes a method. In this example, the method includes, but is not limited to determining a saturation point of a hardware device; determining that estimated time cost for IO jobs pending in the hardware device total to a time cost value that is less than the saturation point; and sending an amount of IO jobs to the hardware device, the amount of IO jobs increasing the estimated time cost for pending IO jobs past at least the saturation point. In addition to the foregoing, other aspects are described in the claims, drawings, and text forming a part of the present disclosure.

An example embodiment of the present disclosure describes a method. In this example, the method includes, but is not limited to receiving IO jobs associated with a client; allocating a quantum amount of time that a hardware device can spend processing client IO jobs, the quantum amount of time based on an estimated amount of time required by the hardware device to perform a seek operation; and sending client IO jobs to the hardware device, the amount of client IO jobs having an estimated time cost equal to or less than the allocated quantum amount of time. In addition to the foregoing, other aspects are described in the claims, drawings, and text forming a part of the present disclosure.

An example embodiment of the present disclosure describes a method. In this example, the method includes, but is not limited to storing a time value associated with a client, the time value being in a delay state, the delay state indicating that the hardware device was overused by the client; receiving a job completion signal from a hardware device; increasing the time value an amount of time to increase the value to an issue state and an additional amount that is based on a saturation point for the hardware device; and sending IO jobs to the hardware device that are eligible based on the increased time value. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
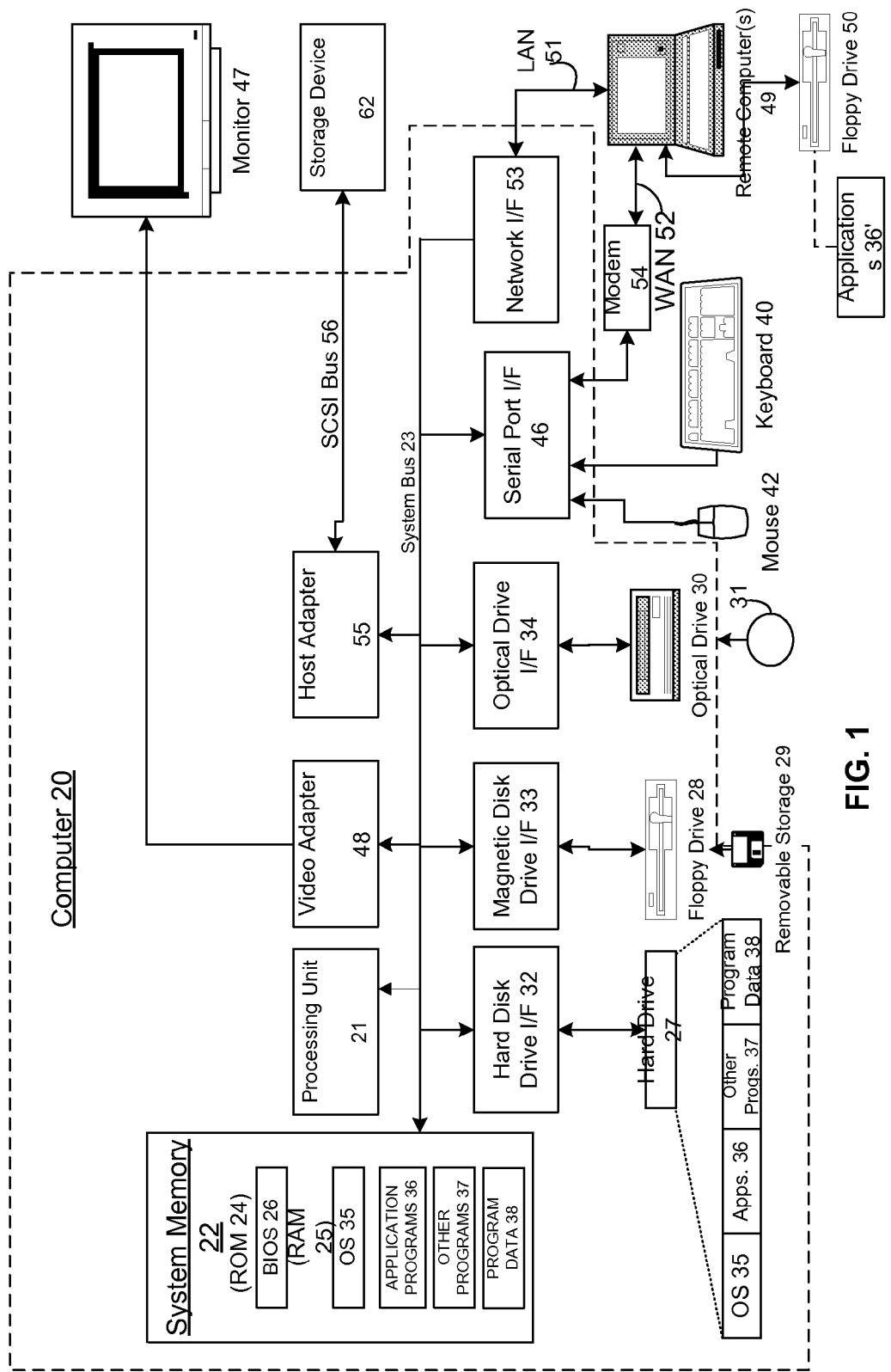
FIG. 1 depicts an example computer system wherein aspects of the present disclosure can be implemented.

Embodiments of the present disclosure may execute on one or more computers. FIG. 1 and the following discussion is intended to provide a brief general description of a suitable computing environment in which the disclosure may be implemented. One skilled in the art can appreciate that some or all of the components of the computer system of FIG. 1 can be used to effectuate computer 200 of FIG. 2 and the computer 200 of FIG. 3.

The term circuitry used through the disclosure can include specialized hardware components such as hardware interrupt controllers, hard drives, network adaptors, graphics processors, and audio codecs for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21 that can include one or more logical processors, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
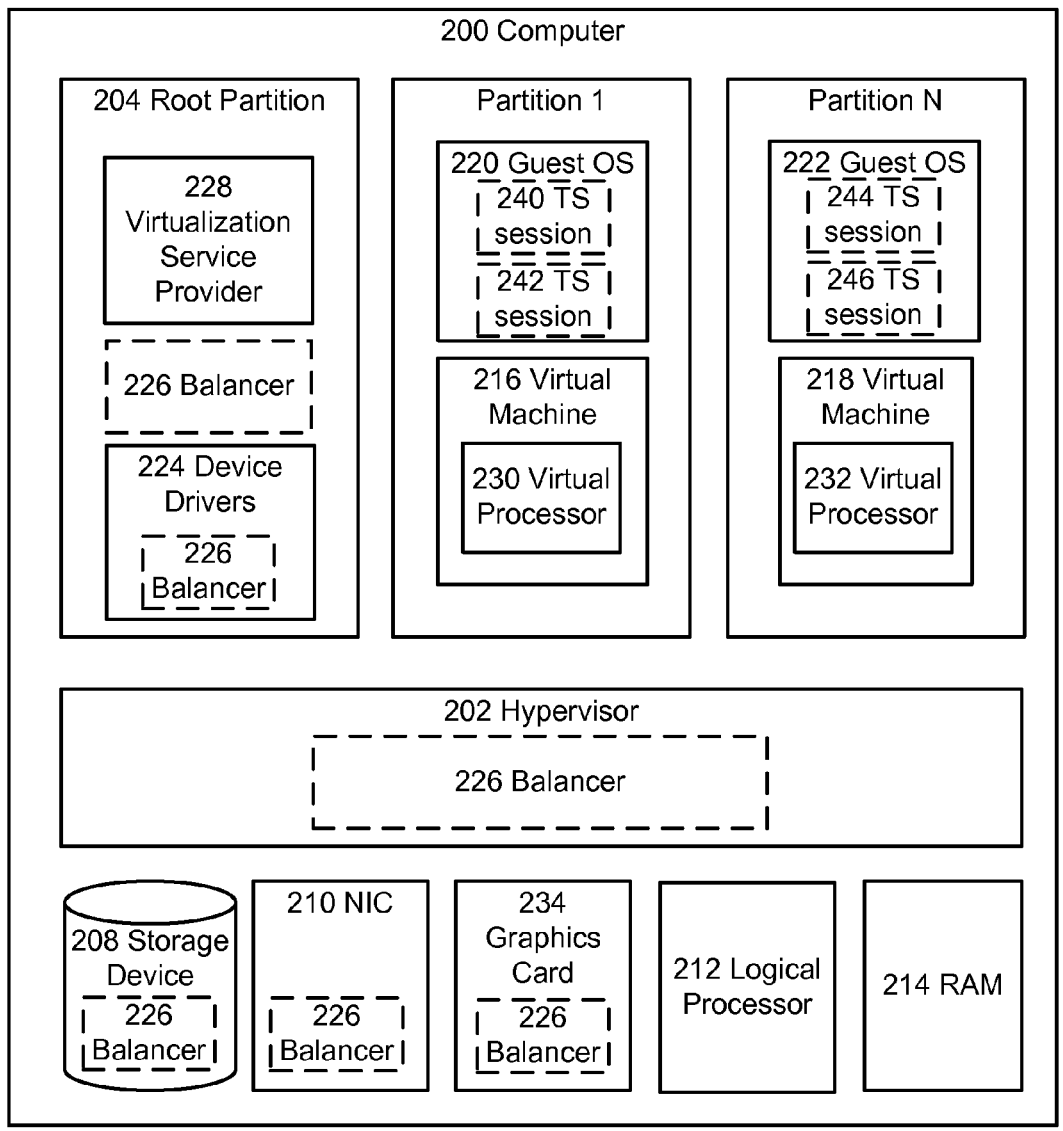
FIG. 2 depicts an operational environment for practicing aspects of the present disclosure.
Figure 3:
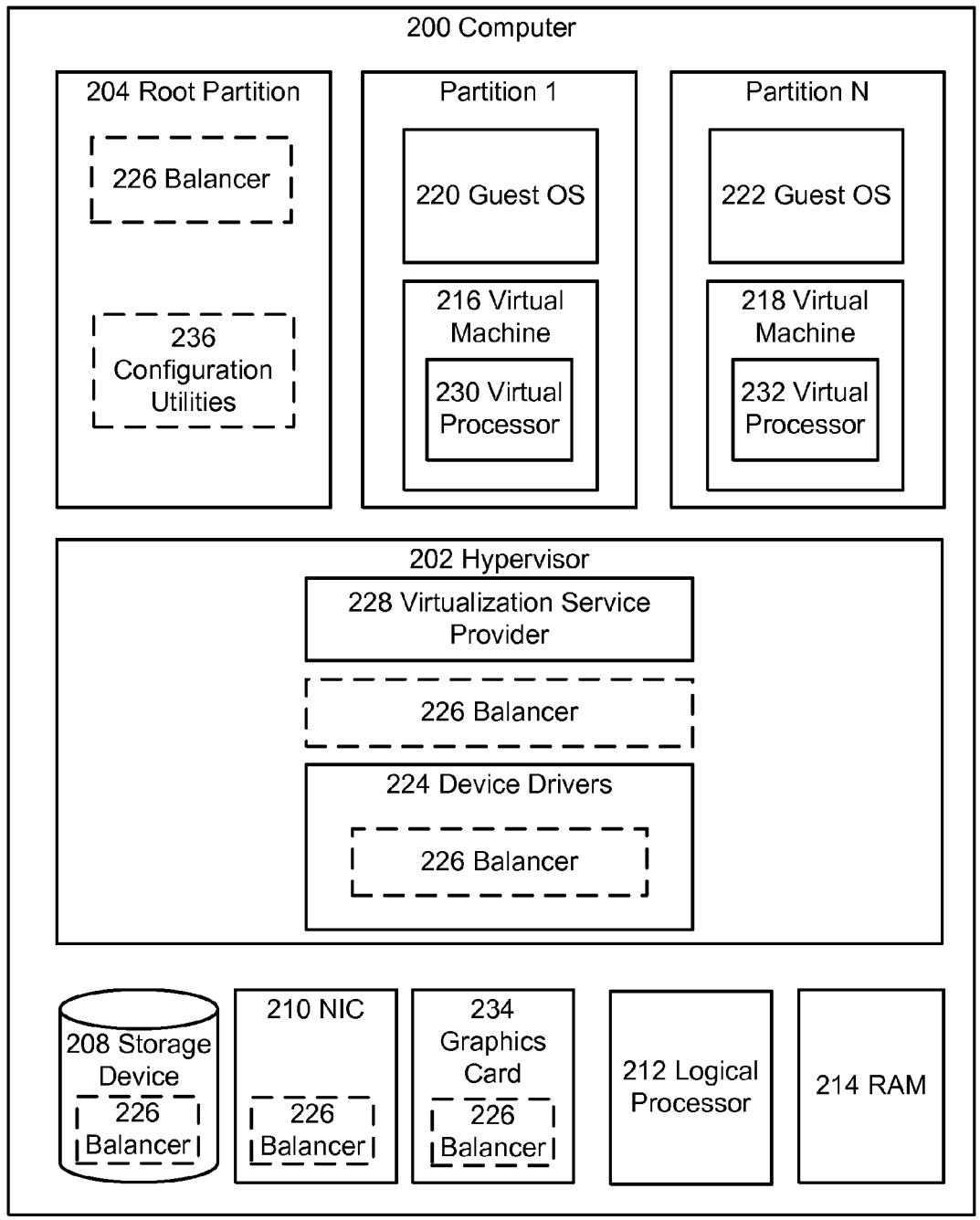
FIG. 3 depicts an operational environment for practicing aspects of the present disclosure.

Referring now to FIGS. 2 and 3, they depict high level overviews of computer systems including circuitry for virtualizing resources that can be used in aspects of the present disclosure. As shown by the figure, computer 200 can include physical hardware devices such as storage device 208, e.g., a hard drive, a network interface controller (NIC) 210, e.g., a network interface card or Ethernet adapter, a graphics card 234, at least one logical processor 212 and random access memory (RAM) 214. One skilled in the art can appreciate that while one logical processor is illustrated in other embodiments computer 200 may have multiple logical processors, e.g., multiple execution cores and/or multiple processors. In these embodiments multiple threads can be executed at the same time, e.g., one or more threads per logical processor. Continuing with the description of FIG. 2, depicted is a hypervisor 202 that may also be referred to as a virtual machine monitor. The hypervisor 202 in the depicted embodiment includes executable instructions for controlling and arbitrating access to the hardware of computer 200. The hypervisor 202 can generate execution environments called partitions such as partition 1 and partition N (where N is an integer greater than 1.) In embodiments of the present disclosure a partition can be considered the basic unit of isolation supported by the hypervisor 202, that is, each partition can be mapped to a set of hardware resources, e.g., memory, devices, logical processor cycles, etc., that is under control of the hypervisor 202. In an embodiment the hypervisor 202 can be a stand alone software produce, a part of an operating system, embedded within firmware of the motherboard or a portion of the hypervisor 202 can be effectuated by specialized integrated circuits.

Continuing with the description of FIG. 2, the computer 200 can include a root partition 204 that may include a virtualization service provider 228 (VSP.) In this example architecture the root partition 204 can access the underlying hardware via device drivers 224. The VSP 228 in this example can effectuate interfaces in partitions know as children, and these children can be considered virtual machines. The virtualization service provider 228 effectuates virtual machines 216 and 218 by instantiating different classes of devices as software and exposes interfaces to the devices within the partitions. Each virtual machine can include a virtual processor such as virtual processors 230 and 232 that guest operating systems 220 and 222 can manage and schedule threads to execute thereon. Generally, the virtual processors 230 and 232 are executable instructions and associated state information that provides a representation of a physical processor with a specific architecture. For example, one virtual machine may have a virtual processor having characteristics of an Intel 80×86 processor, whereas another virtual processor may have the characteristics of a Power PC processor. The virtual processors in this example can be mapped to logical cores of the computer system such that the instructions that effectuate the virtual processors will be backed by logical processors. Thus, in these example embodiments multiple virtual processors can be simultaneously executing while, for example, another logical processor is executing hypervisor instructions.

Continuing with the description of FIG. 2, it additionally illustrates a balancer 226. The balancer 226 can include computer executable instructions that can balance hardware usage among a plurality of clients using a variety of techniques to reduce resource starvation experienced by a client and maximize throughput. As is illustrated by the dashed lines of FIG. 2, the balancer 226 can be loaded within the computer executable code that effectuates the hypervisor 202 or in other embodiments the balancer 226 can be part of the code that effectuates the root partition 204. The balancer 226 can in other embodiments be a stand alone piece of code that is not part of another piece of code, e.g., the balancer 226 does not have to be part of the hypervisor 202 or the root partition 204 and the disclosure is not limited to the depicted embodiments. The balancer 226 can additionally be part of a driver for a hardware device. In this example driver developers can augment the existing algorithms used to maximize throughput with techniques described herein. As shown by the figure, the balancer 226 can additionally be embedded within the physical hardware devices in the form of specialized circuits or firmware.

Referring now to FIG. 3, it illustrates an alternative architecture that can be used to practice embodiments of the present disclosure. FIG. 3 depicts similar components to those of FIG. 2, however in this example embodiment the hypervisor 202 can include the virtualization service provider 228 and device drivers 224, and the root 204 can contain configuration utilities 236. In this architecture the hypervisor 202 can perform the same or similar functions as the hypervisor 202 of FIG. 2. The hypervisor 202 of FIG. 3 can be a stand alone software produce, a part of an operating system, embedded within firmware of the motherboard or a portion of the hypervisor 202 can be effectuated by specialized integrated circuits. In this implementation the hypervisor 202 can be thought of as instructions that execute directly on the bare metal of the hardware. In this example the root partition 204 may have instructions that can be used to configure the hypervisor 204 however hardware access requests may be handled by the hypervisor 202 instead of being passed to the root partition 204. Similar to that above, the balancer 226 can be included within the instructions that effectuate the hypervisor 202, the instructions that effectuate the root partition 204, any other place within the computer system 200, or by hardware.

In embodiments of the present disclosure the balancer 226 is operable to manage the flow of IO jobs from a client to a hardware device such that resource starvation is reduced and high throughput is obtained. Generally, and throughout the disclosure concepts will be described using units of time instead of byte count or IO job count for ease of explanation and the disclosure is not limited to implementations where calculations are based in and on time. That is, in other example implementations the disclosed algorithms can be modified to be based on IO job count or byte count since there are relationships between IO jobs, bytes in IO jobs, and time that will be described in more detail below and in the related applications.

The balancer 226 can calculate the throughput of the hardware device in order to attempt to maximize the hardware device's throughput. Hardware devices do not generally provide any meaningful information about throughput, thus alternative techniques need to be used. In example embodiments the throughput of the hardware device can be obtained using the amount of time required to complete IO jobs pending in the hardware device (the time cost of pending IO jobs.) For example, time cost represents an estimated amount of time that the hardware device will require in order to complete an IO job. Or put another way, time cost represents the amount of 'dedicated' time that the hardware device will take to execute a given IO job and return a completion signal to the balancer 226. If a hardware device can only execute one IO job at a time, then the IO time cost of an IO job is just the time duration from when the IO job is issued to the hardware until the hardware completes the IO job. In this example the entire time duration is dedicated to the one IO job because the hardware can't make progress on more than one IO job at a time. In another example a storage device may have 6 separate drives and can execute 16 IO jobs at a time. In this example the duration of time from when the IO job is issued until it completes is not equivalent to its IO time cost. In this example the IO time cost may be as low as $\frac{1}{16}^{th}$ of the duration.

The throughput of a hardware device can be calculated from the time cost for the IO jobs that are pending in the hardware device. Each IO job that is pending, e.g., in-flight, in the hardware device can have a time cost and the total time cost for the pending IO jobs can represent how much 'work' the hardware device has. Generally, the time cost for an IO job can be estimated based on the characteristics of the IO job itself. Each characteristic can be associated with a cost factor, e.g., a scalar that represents how expensive the characteristic is. The balancer 226 can multiply each characteristic by its corresponding cost factor and the total number can be the time cost for the IO job. In other example embodiments techniques described in U.S. patent application Ser. No. 12/242,621 entitled "HARDWARE THROUGHPUT SATURATION DETECTION" can be used to estimate an IO job's time cost.

From the estimated total amount of 'work' that the hardware device has pending the maximum throughput of the hardware device can be obtained. Generally, as the time cost of the pending IO jobs increases so does throughput. This is because hardware devices such as storage devices complete IO jobs in accordance with internal algorithms (performed either in hardware, firmware, or in the driver) that attempt to select IO jobs to execute so that the most amount of jobs can be completed within the shortest period of time. This is most efficiently accomplished when the hardware device has a plethora of IO jobs to select from. Generally, as time cost of pending IO jobs increases so does throughput up to a saturation point, or a point where the addition time cost of an additional IO job provides no significant additional hardware throughput. Or put another way, the addition of another IO job does not significantly increase the ability of the hardware device to complete IO jobs faster In an embodiment the saturation point can be used as a target latency value, or a time cost of pending IO jobs that the balancer 226 wants to keep the hardware device above in order to achieve high throughput.

In order to achieve high throughput the balancer 226 can keep the hardware saturated with IO jobs and in order to reduce starvation the balancer 226 can use techniques described herein to select which IO jobs to send to the hardware. For example, IO jobs can be sent to the hardware device based on the amount of time a client used the hardware device. As the balancer 226 sends more IO jobs associated with one client to the hardware device the client's allocated amount of time can be used up. When a client uses up their allotted time client IO jobs can be stored in a queue and other IO jobs from other clients can be sent to the hardware device. Generally speaking, the balancer 226 can attempt to keep the hardware device saturated with IO jobs from one client, and then keep the hardware device saturated with IO jobs from another client. In this implementation, throughput is high, and resource starvation experienced by clients is relatively low compared to the situation where one client is dominating the hardware device.

In one example implementation 'flows' are used by the balancer 226 to keep track of which client has overused the hardware device and which client can use the hardware device. For example, a flow can represent the IO jobs being issued from a specific client to a specific hardware device. Thus, if there are multiple hardware devices a client could have two flows, e.g., one for each hardware device. In an implementation each flow can be a value that represents the total amount of time the client can use or has overused the hardware device. Conceptually speaking a positive value can represent time a client can use whereas a negative value can represent how much the client overused a hardware device. While the terms 'positive' and 'negative' are used throughout the disclosure one skilled in the art can appreciate that this is to provide a simple way to illustrate concepts and that the terms 'positive' and 'negative' are not limited to their literal meaning. That is, in an embodiment a 'negative' value could be any information that can be interpreted by a computer as meaning that a client has overused the hardware whereas a positive number can be any information that can be interpreted by a computer as meaning the client has time available on the hardware device. One of skill in the art can appreciate that in embodiments where the balancer 226 is configured to provide short term balance the flows may not go negative. That is, a client may not overuse a hardware device. In certain embodiments however the cost of switching flows may be higher than the cost of allowing the client to overuse the hardware device, thus in these and other embodiments the balancer 226 may be configured to allow a client to overuse the hardware device in order to keep throughput high.

In order to achieve balance the balancer 226 can be configured in an implementation to reduce a client's flow based on the time cost of the IO jobs that are sent to the hardware device. That is, if the time cost of an IO job is 5 ms and it is sent to the hardware device, the client's flow can be reduced by 5 ms. In the same, and other embodiments the techniques used to select IO jobs and adjust a client's flow can be obtained from U.S. application Ser. No. 12/242,624 entitled "BALANCING USAGE OF HARDWARE DEVICES AMONG CLIENTS."

Figure 4:
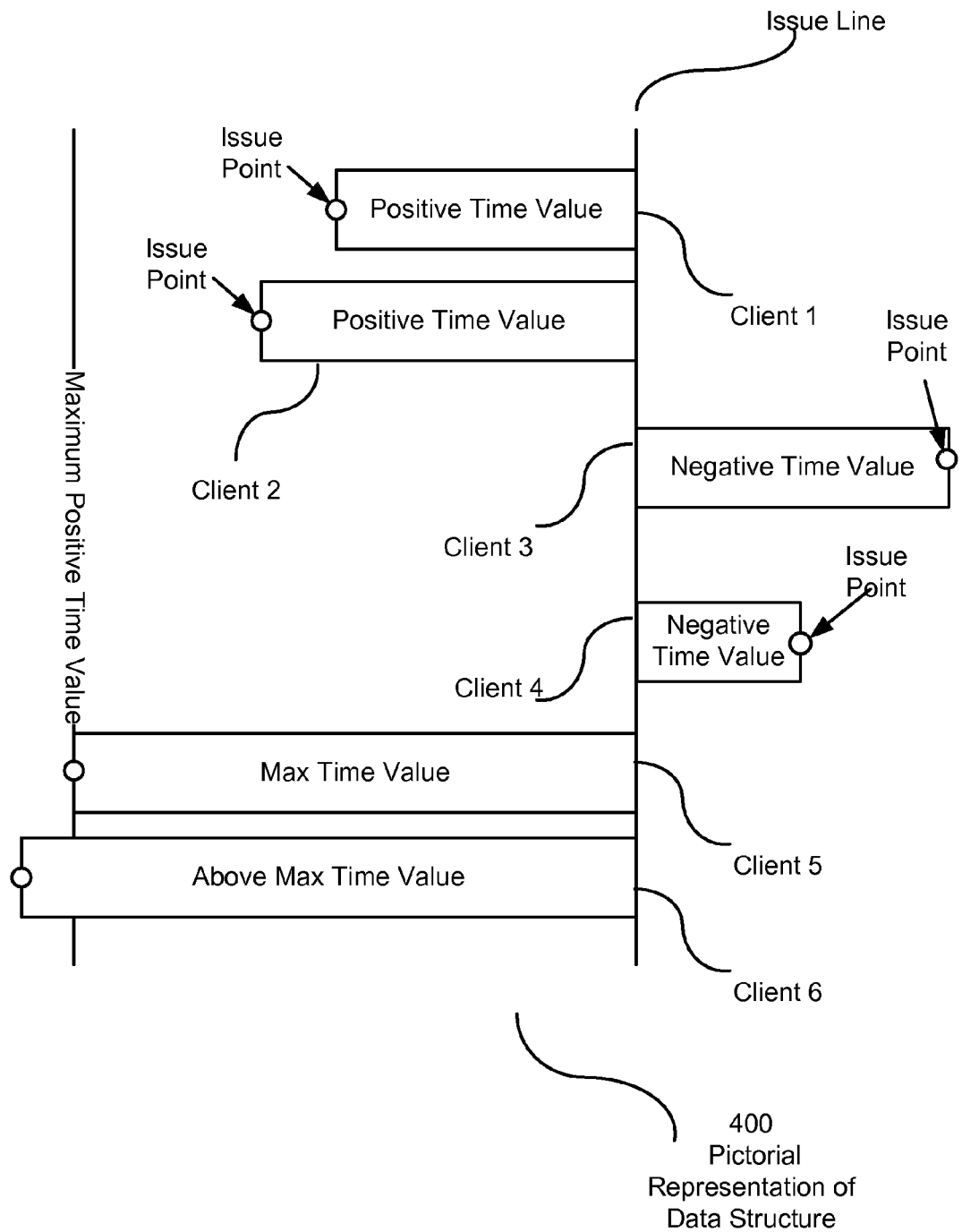
FIG. 4 provides an example that can be used to illustrate the concept of flows.

FIG. 4 provides an example that can be used to illustrate the concept of 'flows.' FIG. 4 generally provides a pictorial representation of a data structure 400 that the balancer 226 can maintain in order to balance hardware usage among clients. As was stated above, in an embodiment each client can have an associated flow and the flow can be positive or negative (for example the flow for client 1 is positive whereas the flow for client 4 is negative.) In this example a positive value can represent an amount of time a hardware device can spend completing IO jobs from its associated client before subsequent jobs will be queued. A negative number can represent the amount of time that the client overused the hardware device. The issue point in this implantation can be a value that the determination of the beginning of a flow. In a specific implementation a flow's value can be represented as the difference between two numbers stored in RAM, e.g., a number indicative of the issue line and a number indicative of the issue point for the flow. In an example the difference could be positive, that is the issue line could be more positive than the issue point. In this example the issue line could be 20 ms, the issue point for client flow 1 could be 10 ms and the difference can be 10 ms (which could be indicative of a positive flow.) On the other hand the issue point for client 3 flow could be 30 ms and the difference between the issue line and the issue point could be −10 (which indicates that the flow is negative.)

The following are a series of flowcharts depicting implementations of processes. For ease of understanding, the flowcharts are organized such that the initial flowcharts present implementations via an overall "big picture" viewpoint and subsequent flowcharts provide further additions and/or details. Those having skill in the art will appreciate that the style of presentation utilized herein generally allows for a rapid and easy understanding of the various operational procedures that form a part of the present disclosure.

Figure 5:
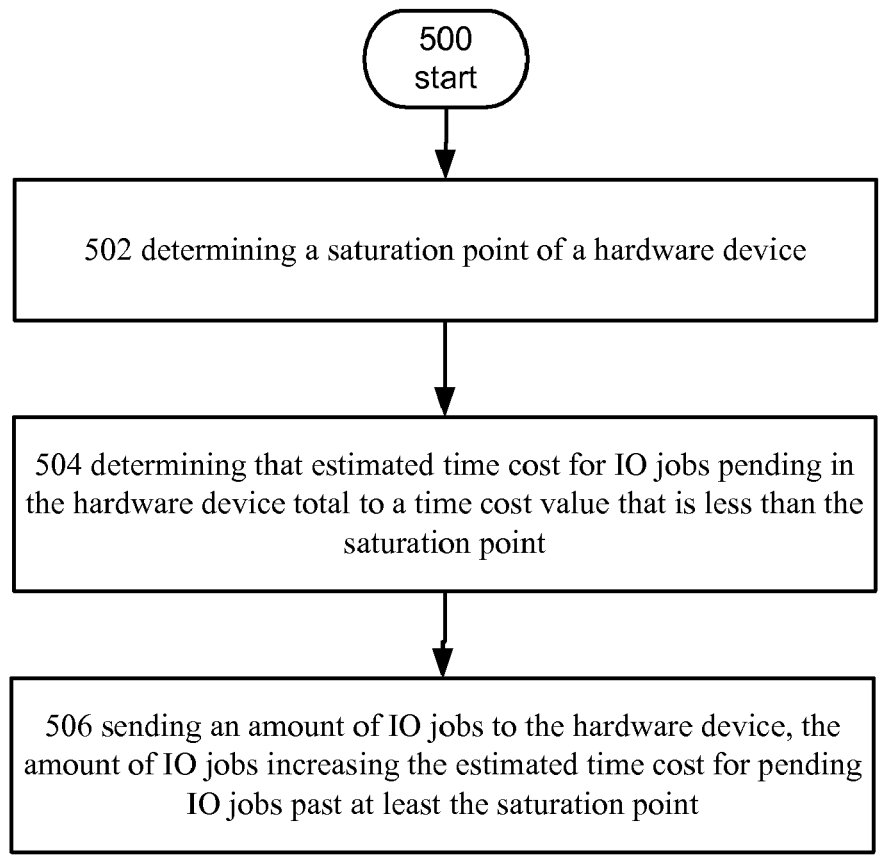
FIG. 5 illustrates an operational procedure for IO job batching.

Referring now to FIG. 5, it illustrates an operational procedure for IO job batching including operations 500, 502, 504, and 506. Generally, operation begins the operational procedure and operation 502 depicts determining a saturation point of a hardware device. For example, in an embodiment a balancer 226 can be software instructions in the root partition and a processor 212 can execute the instructions and determine a saturation point of a hardware device such as a storage device 208. In an implementation a saturation point can be stored in memory accessible by the balancer 226. In this example the an administrator can configure the value based on observed characteristics of the hardware device and/or by performing experiments. In this example the processor 212 can determine the saturation point by loading the value during runtime. In an alternative embodiment, one in which the balancer 226 is a component of a driver of the storage device, the saturation point can be stored in a memory location of the hardware device, e.g., ROM of the hardware device, etc., and can be retrieved by the balancer 226.

Continuing with the description of FIG. 5, operation 504 shows determining that estimated time cost for IO jobs pending in the hardware device total to a time cost value that is less than the saturation point. For example, in an example embodiment the processor 212 can execute the balancer instructions and determine that the time cost estimates for the IO jobs that are currently pending in the hardware device total to a value that is less than the saturation point. For example, and described above, each IO job received from a client such as a virtual machine can be analyzed and the processor 212 can run the balancer instructions to determine an estimated amount of time that it will take for the hardware device to complete the pending IO jobs. In one embodiment the estimation can be made using techniques described in commonly owned U.S. patent application Ser. No. 12/242,621 entitled "HARDWARE THROUGHPUT SATURATION DETECTION" filed herewith and incorporated by reference in its entirety. In another example embodiment an empirical study IO jobs can be made by an implementer and a static time cost value can be assigned to each incoming IO job such as 8 ms.

Continuing with the example, once the estimate is made for each IO job they can be sent to the hardware device where they can be stored in a buffer of the hardware device. In this example, the balancer 226 can keep track of the IO jobs that have been sent but no completion signal has yet been received and the time cost estimates. For example, if the balancer 226 sent 11 IO jobs to the hardware each IO job estimated to cost 8 ms, the balancer 226 could determine that a total time cost value is equal to 88 ms. If a completion signal is received by the balancer 226 for an IO job the processor 212 can be configured to execute the balancer 226 and a determination can be made that the total time cost value has dropped to 80 ms. The balancer 226 can store a value indicative of the estimated time cost for the pending IO jobs and compare the value to the saturation point to determine whether the time cost for pending IO jobs is lower than the saturation point.

Continuing with the description of FIG. 5, operation 506 shows sending an amount of IO jobs to the hardware device, the amount of IO jobs increasing the estimated time cost for pending IO jobs past at least the saturation point. For example, the balancer 226 in an example embodiment can be effectuated by instructions and executed by the processor 212. The processor 212 can select one or more IO jobs from a balancer queue and send the selected IO jobs to the hardware device. In this example the selected amount of IO jobs can have time cost values that total to an amount that will push the total in-flight time cost of pending IO jobs past the saturation point. For example and referring to the previous example in an embodiment where the saturation point is 83 ms (determined empirically for example) and the total time cost of pending IO jobs is 80 ms, the processor 212 can determine to send one or more IO jobs, e.g., a batch of IO jobs, to the hardware device to increase the time cost of pending IO jobs past at least the saturation point by sending, for example, the IO jobs having an estimated time cost of 10 ms. In this way the processor 212 can be configured to keep the hardware device saturated with pending IO jobs.

Figure 6:
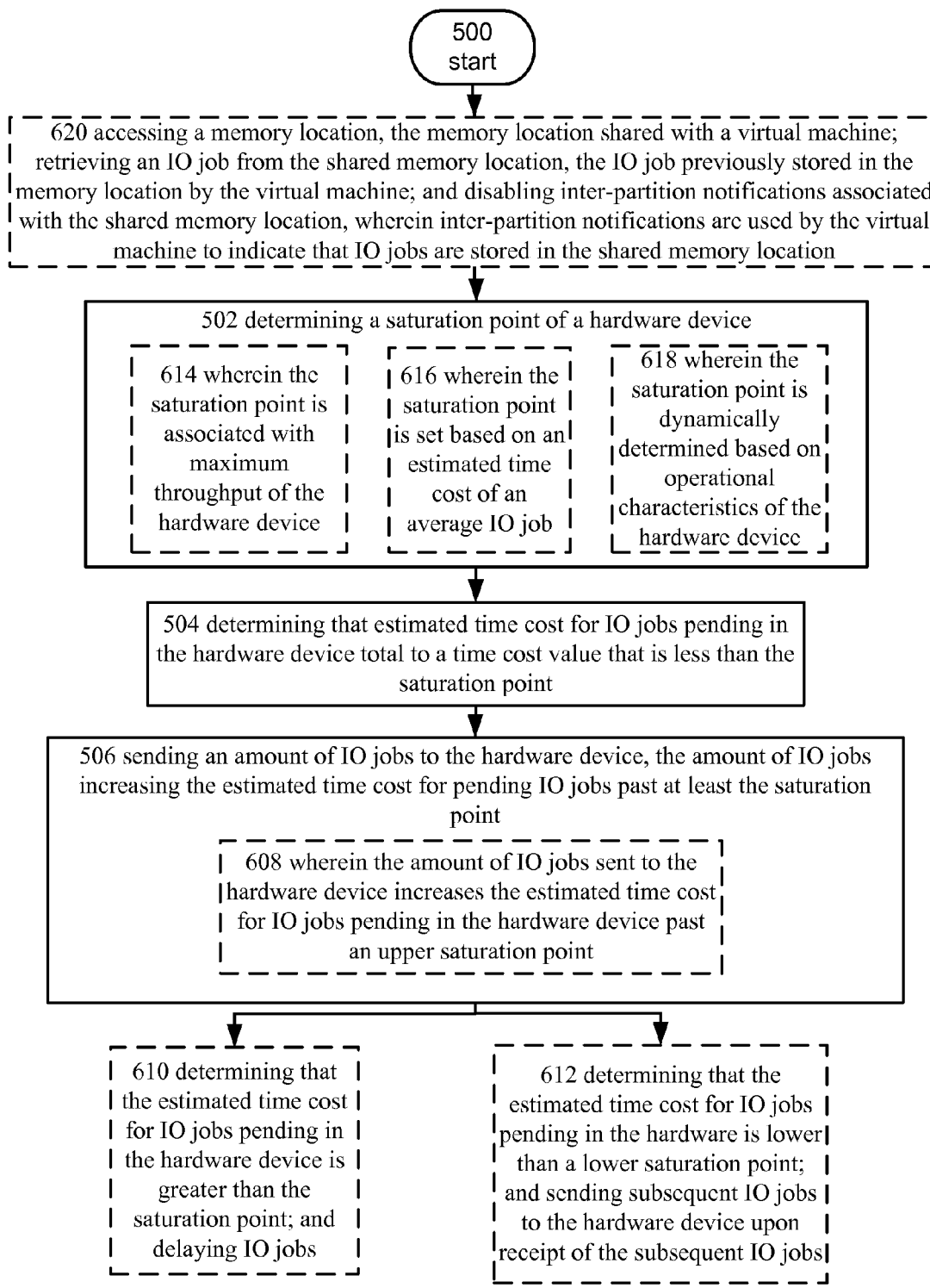
FIG. 6 depicts an alternative embodiment of the operational procedure 500 of FIG. 5.

Referring now to FIG. 6, it depicts an alternative embodiment of the operational procedure 500 of FIG. 5 including the additional operations 608-620. Referring to operation 608, it illustrates the operational procedure of FIG. 5, wherein the amount of IO jobs sent to the hardware device increases the estimated time cost for IO jobs pending in the hardware device past an upper saturation point. For example, in an embodiment the balancer 226 can be executed by a processor 212 and a batch of IO jobs can be sent to the hardware device in order to increase the time cost of pending IO jobs past an upper time value. For example, in an embodiment the balancer 226 can be configured to send a group of IO jobs that will increase the time cost of pending IO jobs up past, for example, 120% of the saturation point. In this example processor utilization can be made more efficient because the balancer 226 can be run once to increase the time cost of pending IO jobs up to the upper saturation point and allow the time cost of pending IO jobs to drain down to the saturation point before having to run the balancer code again. For example, in example implementations the balancer 226 instructions are run in order to select which IO jobs to send and this calculation requires computer cycles. Thus in this example embodiment the balancer 226 can be run once and a batch of IO jobs can be sent to the hardware device. The upper saturation point can be determined based on how often an implementer wants to run the balancer code. For example, if the upper saturation point is set to 101% the balancer code may be run often, increasing processor utilization.

Continuing with the description of FIG. 6, operation 610 shows determining that the estimated time cost for IO jobs pending in the hardware device is greater than the saturation point; and delaying IO jobs. For example, once an amount of IO jobs are sent to the hardware device to increase the total time cost of pending IO jobs past the saturation point, the balancer 226 instructions may be executed again and the state can be reevaluated. The balancer 226 in this example can be executed by the processor 212 and a determination can be made that the total time cost of pending IO jobs value is greater than the saturation point, that is, the total time cost value may be calculated to be 88 ms whereas the saturation point may be 83 ms. In this example the balancer 226 may delay incoming IO jobs by storing them in a queue instead of issuing them to the hardware. In this example by storing the IO jobs in a queue, and saturating the hardware device, the end result is that the hardware device will complete IO jobs from other clients. By using techniques described in application Ser. No. 12/242,624 entitled "BALANCING USAGE OF HARDWARE DEVICES AMONG CLIENTS" filed herewith and incorporated by reference in its entirety the balancer 226 can selectively choose which IO jobs to delay and by using techniques described in operation 608 the balancer 226 can selectively choose an amount of IO jobs to increase the completion value past the saturation point. The emergent behavior of a system using these techniques is that the hardware device can remain saturated with selected IO jobs chosen by the balancer 226 in a way that minimizes resource starvation experienced by clients. This behavior is desirable because a hardware device may have a bias towards a stream of IO jobs from one client because the stream is more efficient for the hardware device to complete. As the hardware device spends more and more of its processing time completing jobs from given client, the balancer 226 will send less and less jobs from that client to the hardware device's buffer and instead store them in the balancer queue. Eventually the hardware device may not have any jobs from the efficient client and the hardware device will be forced to complete other IO jobs for other clients.

Continuing with the description of FIG. 6, operation 614 shows determining that the estimated time cost for IO jobs pending in the hardware is lower than a lower saturation point; and sending subsequent IO jobs to the hardware device upon receipt of the subsequent IO jobs. For example, in an embodiment the hardware device may not be used enough by the clients and the time cost of pending IO jobs may fall way below the saturation point and past a lower saturation point that can be, for example, a fraction of the saturation point. In this example the potential for starvation may be lower than the cost associated with balancing so the balancer 226 can be configured to issue all IO jobs as they are received from the client until the time cost of pending IO jobs is greater than the lower saturation point. For example, balancing injects additional latency into each IO job from the perspective of the client, e.g., by running the balancer 226, however this additional latency is offset by the benefits that balancing introduces when the time cost of the IO jobs in flight is higher than the lower saturation point and between the saturation point. In this example, when the saturation point can not be obtained, the actual obtainable value can be determined and for example 80% of that value can be set as a temporary saturation point value in the balancer 226. In this example the balancer 226 can be configured to determine whether the time cost of IO jobs in flight to the hardware is less than the temporary saturation point value and send an amount of IO jobs that pushes the time cost of pending IO jobs past 120% of the temporary saturation point value.

Continuing with the description of FIG. 6, operation 616 shows wherein the saturation point is associated with maximum throughput of the hardware device. For example, in an embodiment the saturation point can be set to the lowest amount of IO time cost in flight which achieves maximum throughput of the hardware device. In this example embodiment empirical studies of hardware devices can be conducted an the total time cost of IO jobs can be calculate that fully maximizes the throughput of the hardware device. In this example the addition of any more time cost to the hardware device would not significantly increase the rate at which the hardware device can complete IO jobs.

Continuing with the description of FIG. 6, operation 618 shows wherein the saturation point is set based on an estimated time cost of an average IO job. For example, in one embodiment the saturation point can be set based on the average IO job size. In this example the average time cost of an IO job can be estimated using techniques described in U.S. application Ser. No. 12/242,621 entitled "HARDWARE THROUGHPUT SATURATION DETECTION." The amount of IO jobs that will saturate the hardware device can also be determined and the saturation point can be set to the number of IO jobs multiplied by the estimated time cost of an average IO job.

Continuing with the description of FIG. 6, operation 620 shows wherein the saturation point is dynamically determined based on operational characteristics of the hardware device. For example, in an implementation the balancer 226 can be effectuated by software instructions and executed by a processor 212 in order dynamically adjust the target latency value based on, for example, the throughput of the hardware device. For example, in instances where the hardware device is switched or another hardware device is added, the target latency value may change. In this example, the target latency value can be adjusted by increasing the target latency value periodically and determining whether throughput significantly increases based on the addition of, for example, 1 more ms of total time cost pending in the hardware device. If for example increasing the target latency value by a factor of 1.1 increases throughput buy a factor of 1.8 the balancer 226 can determine that the saturation point has not been reached. In this instance the balancer 226 can further multiply the target latency value by 1.1 the next time the balancer 226 is executed. If for example, increasing the target latency value by a factor of 1.1 increases throughput by a factor of 1.01 then the processor 212 can determine that the hardware device is saturated and the processor 212 can use the updated target latency value the next time the balancer 226 instructions are executed. One skilled in the art can appreciate that the ratios presented herein are exemplary and embodiments of the present disclosure are not limited to using any particular ratio of throughput to decreased average completion time.

Continuing with the description of FIG. 6, operation 622 shows accessing a memory location, the memory location shared with a virtual machine; retrieving an IO job from the shared memory location, the IO job previously stored in the memory location by the virtual machine; and disabling inter-partition notifications associated with the shared memory location, wherein inter-partition notifications are used by the virtual machine to indicate that IO jobs are stored in the shared memory location. In an example embodiment inter-partition interrupts can be disabled when, for example, the saturation point has been reached. In virtual machine implementations a shared memory location such as a ring buffer may be used by a virtual machine, such as virtual machine 216 to send messages to the virtualization service provider 228. Generally, when a processor 212 is executing a virtual machine 216 and an IO job is placed in the shared memory location an interrupt is triggered in order to notify the root partition 204 and process the instructions indicative of the virtualization service provider 228 upon receipt of the notification. The processor 212 can then retrieve the IO job from the shared memory location and send it to the balancer 226. In order to switch from the virtual machine to the root CPU cycles are spent performing the switch such and receiving the notification as, for example, 2 to 3 thousand computer cycles. This can be considered a costly operation. Thus, in embodiments where the IO jobs are being delayed by the balancer 226, the inter-partition notification used to direct the root 204 to handle the message can be disabled. That is, if IO jobs are going to be delayed by the balancer 226, there is no reason to retrieve the IO jobs from the shared memory location and incur the CPU cost of notifications. Thus, the IO jobs can be delayed by leaving them in the shared memory location until a point when the balancer 226 is being processed by the processor 212.

In an implementation the inter-partition notification can be disabled until the total time cost of the IO jobs that are pending in the hardware device falls below the saturation point. When the total time cost falls below the saturation point the notification can be enabled and the notification interrupt can occur. In this example the processor 212 may execute an interrupt handler and execute the balancer code. The processor 212 can then access the shared memory location and retrieve the IO jobs. In this example the processor 212 can then disable the inter-partition notifications and send and/or delay IO jobs. In an alternative implementation when the total time cost of pending IO jobs falls below the saturation point the processor 212 can be configured to poll the shared memory location in order to retrieve IO jobs. In this example the processor 212 can then re-enable inter-partition notifications if the time cost of pending IO jobs drops below the lower saturation point or keep the inter-partition notifications disabled.

Figure 7:
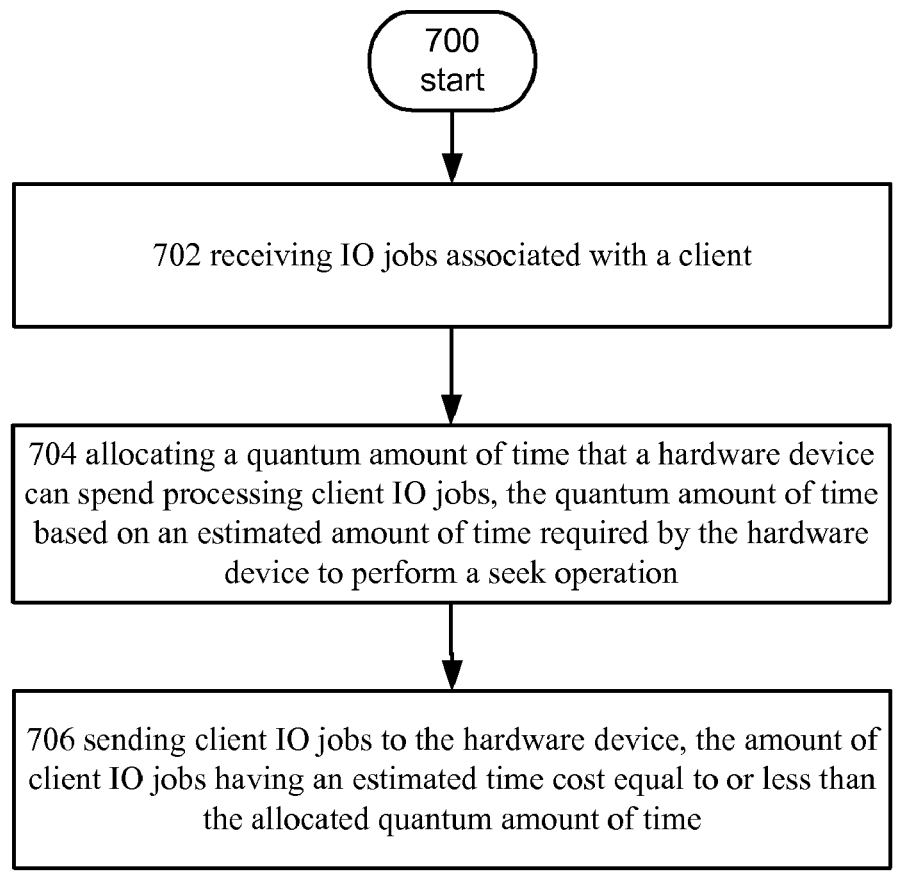
FIG. 7 illustrates an operational procedure for batching IO jobs.

Referring now to FIG. 7, it illustrates an operational procedure for batching IO jobs including operations 700, 702, 704, 706. Operation 700 begins the operational procedure and operation 702 depicts receiving IO jobs associated with a client. For example, the balancer 226 can be run, e.g., a processor 212 can execute code indicative of the balancer 226, and IO jobs from a client, e.g., virtual machine 218, can be obtained. For example, the balancer 226 can have a memory location that is shared with virtual machine 218, e.g., a ring buffer or a self overwriting memory location. In this example the balancer 226 can access the shared memory location and receive information indicative of an IO job.

Continuing with the description of FIG. 7, operation 704 shows allocating a quantum amount of time that a hardware device can spend processing client IO jobs, the quantum amount of time based on an estimated amount of time required by the hardware device to perform a seek operation. In an example embodiment the balancer 226 can be executed by the processor 212 and the processor 212 can allocate a quantum sized amount of time to a client. The quantum sized amount can be an amount of time that is large enough to minimize the overhead associated with seeking from one area of a hard drive to another or put another way, the cost associated with a flow switch. For example, in virtual machine embodiments client data is generally stored on contiguous sectors of a hard drive. When IO jobs from multiple clients are being processed by the hard drive the head may have to seek across the disk in order to complete an IO job, then it may seek across to the other area to complete another IO job. If the IO jobs are from different virtual machines the seeks may require large amounts of time and this behavior impacts throughput. In this example the balancer 226 can allocate a quantum sized 'chunk' of time to a client that is large enough to minimize the throughput lost due to flow switches to an acceptable percentage loss. That is, by assigning each client a large chunk of time the cost of a seek can be amortized over more IO jobs. In specific embodiment the percentage loss can be set to, for example, 8% max loss due to switching. In this example, the larger the overhead incurred by seeking the larger the quantum value. If the IO time cost of a flow switch is 5 ms, and the throughput loss target is set to 8%, then the IO quantum size can be calculated to be 5*100/8=62.5 ms.

Continuing with the description of FIG. 7, operation 706 shows sending client IO jobs to the hardware device, the amount of client IO jobs having an estimated time cost equal to or less than the allocated quantum amount of time. For example, in an embodiment the balancer 226 can send an amount of IO jobs to the hardware device up until the quantum amount of time is used up. In an embodiment the quantum can be used for incoming IO jobs that are received from a shared memory. In an implementation, once the quantum is allocated the value indicative of the quantum can be stored in RAM and can be reduced upon issuance of incoming IO jobs. Once the value is reduced to, for example, a value which is up to one IO job worth of time below 0, the balancer 226 can be configured to determine whether to delay IO jobs from the client or allocate a new quantum amount of time.

Figure 8:
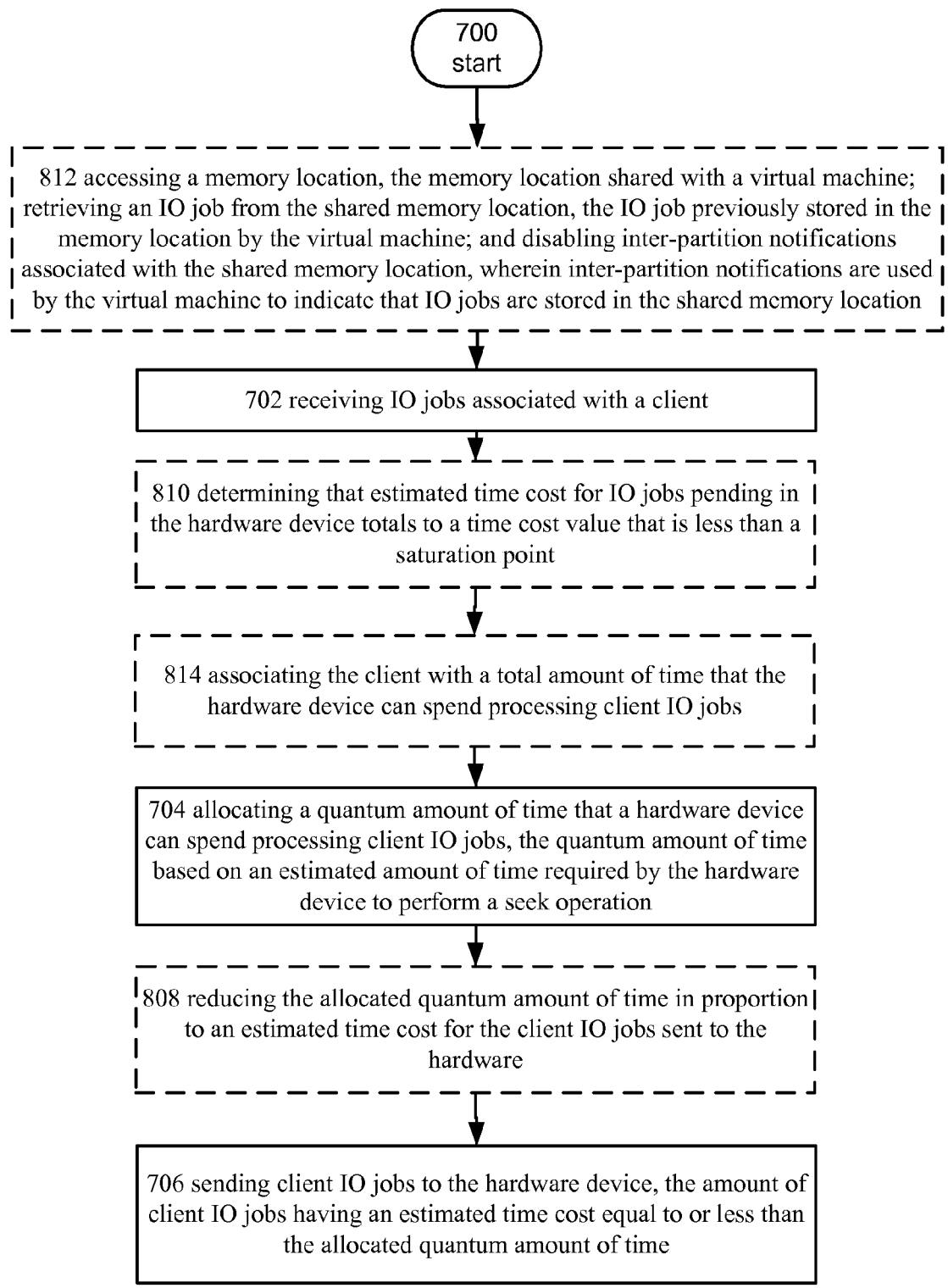
FIG. 8 depicts an alternative embodiment of the operational procedure 700 of FIG. 7.

Referring now to FIG. 8, it depicts an alternative embodiment of the operational procedure 700 of FIG. 7 including the additional operations 808, 810, 812, and 814. Referring to operation 808, it depicts reducing the allocated quantum amount of time in proportion to an estimated time cost for the client IO jobs sent to the hardware. For example, in an embodiment the balancer 226 can estimate how long it will take the hardware device to complete the jobs based on factors such as the operating characteristics of the hardware device, number of bytes in the request, the type of request, e.g., read or write, overhead associated with processing any request, whether the request involves a flow switch or is in non-sequential order (in the storage device example), etc. In other example embodiments the estimation can be obtained using techniques described in U.S. application Ser. No. 12/242,621 entitled "HARDWARE THROUGHPUT SATURATION DETECTION." Once the estimate for each IO job is obtained, the allocated quantum can be reduced in proportion to the estimates.

Continuing with the description of FIG. 8, operation 808 illustrates associating the client with a total amount of time that the hardware device can spend processing client 10 jobs. For example, in embodiments of the present disclosure the balancer 226 can be set to identify a total amount of time that the hardware device can spend processing client IO jobs. In this embodiment if the if the amount of time that the hardware device can spend completing job requests from the client exceeds the total the balancer 226 can delay IO jobs from the client using techniques described in application Ser. No. 12/242,624 entitled "BALANCING USAGE OF HARDWARE DEVICES AMONG CLIENTS."

Continuing with the description of FIG. 8, operation 810 illustrates determining that estimated time cost for IO jobs pending in the hardware device totals to a time cost value that is less than a saturation point. For example, in an example embodiment the processor 212 can execute the balancer instructions and determine that the time cost for the IO jobs that are currently pending in the hardware device total to a value that is less than the saturation point. For example, in this example embodiment each IO job received from a client such as a virtual machine can be analyzed and the processor 212 can run the balancer instructions to determine an estimated amount of time that it will take between when the IO job is issued to the hardware device until when a completion signal is received back. In one embodiment the estimation can be made using techniques described in commonly owned U.S. patent application Ser. No. 12/242,621 entitled "HARDWARE THROUGHPUT SATURATION DETECTION." In another example embodiment an empirical study of IO jobs can be made by an implementer and a static value can be assigned to each incoming IO job such as 8 ms. Once the estimate is made for each IO job they can be sent to the hardware device and the allocated quantum value for the associated client can be reduced. The balancer 226 can allow the client to use up the entire quantum thereby overshooting the upper saturation point for example and may not assign another quantum until the total time cost for IO jobs pending in the hardware drops below the saturation point again.

Continuing with the description of FIG. 8, operation 812 shows accessing a memory location, the memory location shared with a virtual machine; retrieving an IO job from the shared memory location, the IO job previously stored in the memory location by the virtual machine; and disabling inter-partition notifications associated with the shared memory location, wherein inter-partition notifications are used by the virtual machine to indicate that IO jobs are stored in the shared memory location. In an example embodiment inter-partition interrupts can be disabled when, for example, the saturation point has been reached. In virtual machine implementations a shared memory location such as a ring buffer may be used by a virtual machine, such as virtual machine 216 to send messages to the virtualization service provider 228. In an implementation the inter-partition notification can be disabled until the total time cost of the IO jobs that are pending in the hardware device falls below the saturation point. When the total time cost of pending IO jobs falls below the saturation point the notification can be enabled and the notification interrupt can occur. In this example the processor 212 may execute an interrupt handler and execute the balancer code. The processor 212 can then access the shared memory location and retrieve the IO jobs. In this example the processor 212 can then disable the inter-partition notifications and send and/or delay IO jobs. In an alternative implementation when the total time cost of IO jobs pending in the hardware falls below the saturation point the processor 212 can be configured to poll the shared memory location in order to retrieve IO jobs. In this example the processor 212 can then re-enable inter-partition notifications if the time cost of pending IO jobs drops below the lower saturation point or keep the inter-partition notifications disabled.

Continuing with the description of FIG. 8, operation 814 shows associating the client with a total amount of time that the hardware device can spend processing client IO jobs. For example, in an embodiment the client can be associated with a value that can be indicative of the amount of time that the client can use the hardware device. In one embodiment the value can be thought of as associated with a flow as is described above.

Figure 9:
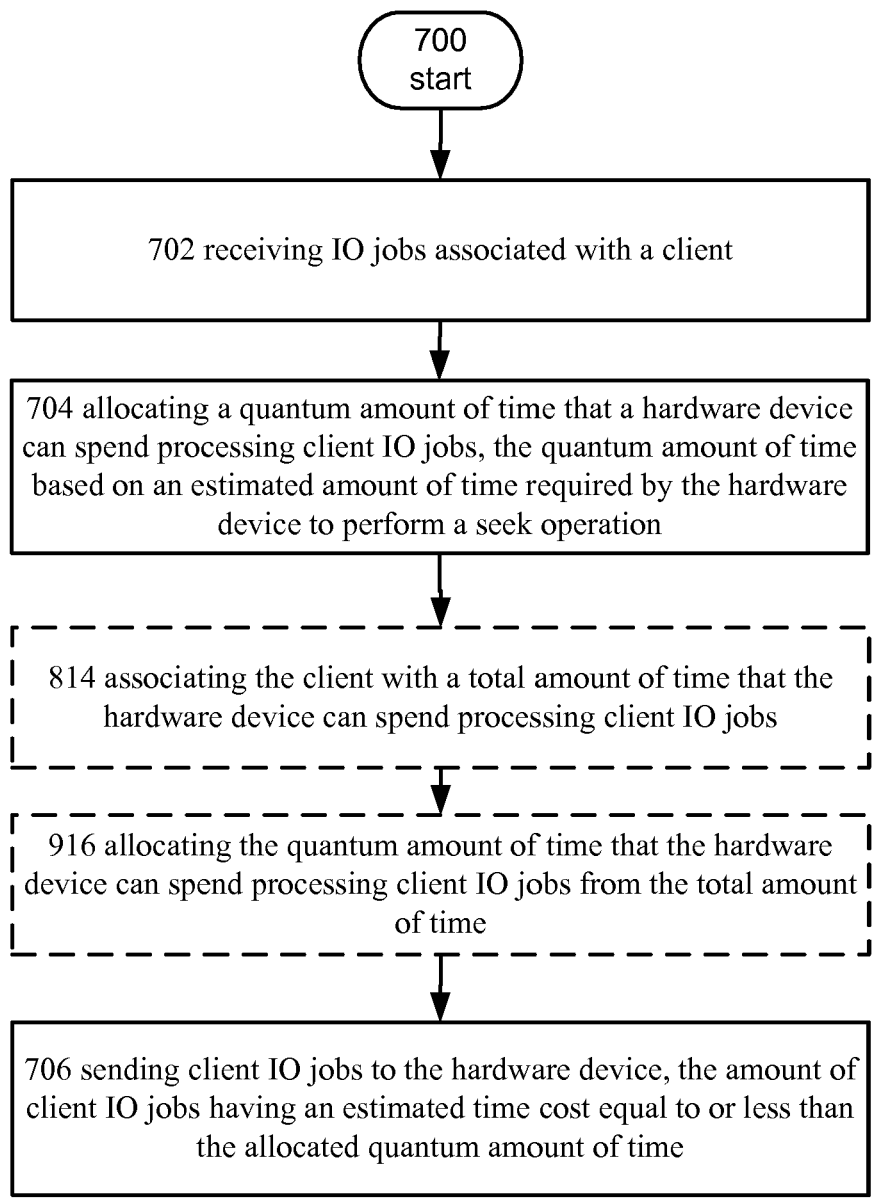
FIG. 9 depicts an alternative embodiment of the operational procedure 700 of FIG. 8.

Referring now to FIG. 9, it depicts an alternative embodiment of the operational procedure 700 of FIG. 8 including operation 916 that shows allocating the quantum amount of time that the hardware device can spend processing client IO jobs from the total amount of time. For example, in this embodiment the quantum amount can be allocated from the time that the hardware device can spend processing client IO jobs such as the client's flow. In this example the balancer 226 can store a value such as 100 ms which can reflect the amount of time that the hardware device can spend processing client IO jobs. In this example the balancer 226 can allocate a quantum sized amount, e.g., 62.5 ms, to the client and reduce the 100 ms to 37.5 ms. Incoming IO jobs can be received from the client and the quantum size can be reduced to 0 for example. When more IO jobs are received the balancer 226 can assign another quantum sized amount to the client and reduce the value from 37.5 ms to −25 ms and allow IO jobs to be sent to the hardware device. In this instance, the negative value can reflect that the hardware device was overused by the client and subsequent IO jobs from the client may be stored in a queue for a period of time after the client's allocated quantum amount is also depleted below zero. In this situation however the starvation caused by allowing the hardware device to process 25 ms of additional IO jobs may be offset by the throughput gain due to not switching from the client's jobs to another client's jobs.

Figure 10:
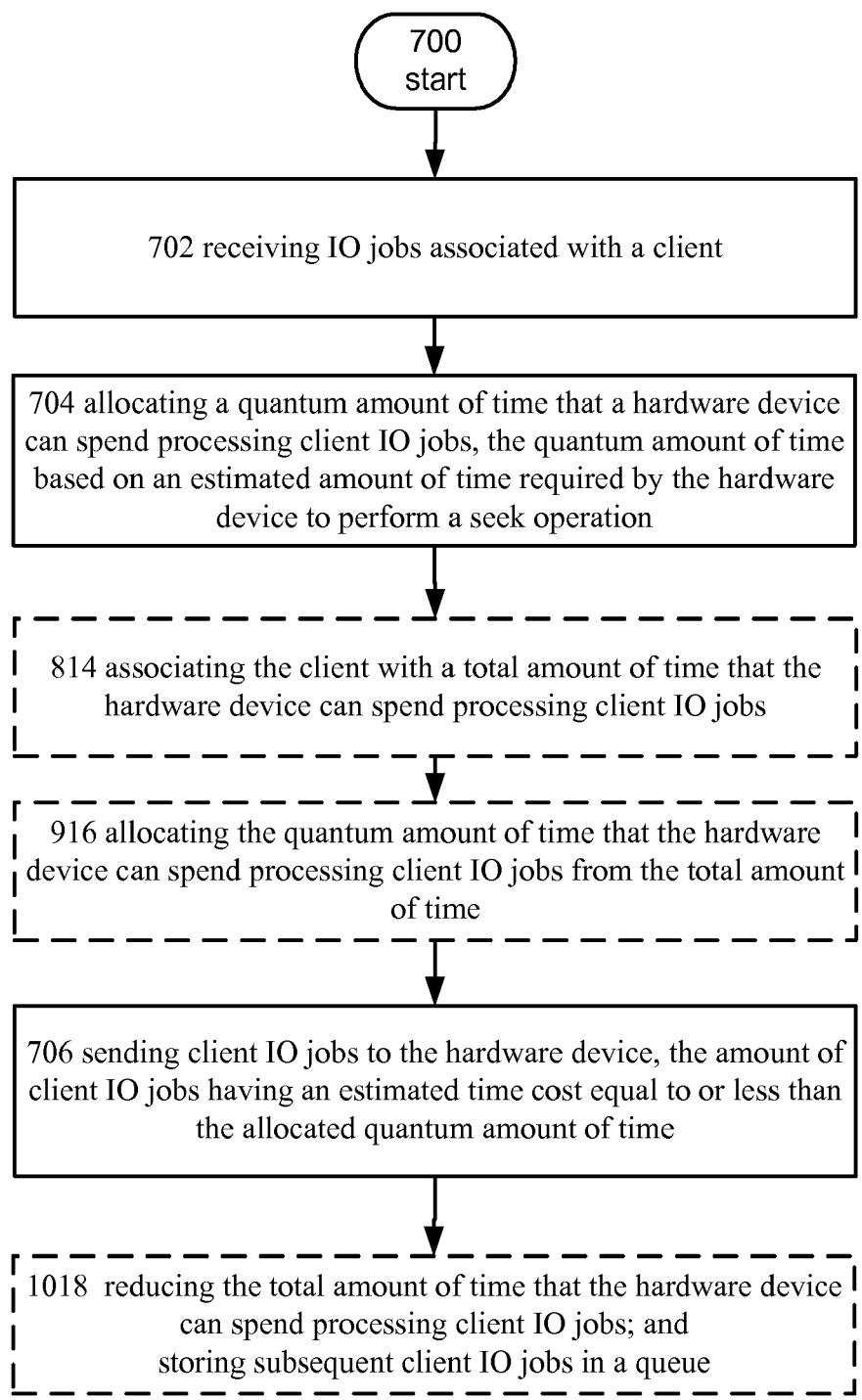
FIG. 10 depicts an alternative embodiment of the operational procedure 700 of FIG. 9.

Referring now to FIG. 10, it depicts an alternative embodiment of the operational procedure 700 of FIG. 9 including operation 1018 that shows reducing the total amount of time that the hardware device can spend processing client IO jobs; and storing subsequent client 10 jobs in a queue. For example, in an embodiment the total amount of time can be reduced by the quantum allocation based an allotted amount, e.g., to −25 ms. In this example the balancer 226 can be configured to regulate how much time the hardware device can spend processing IO jobs from a given client by determining whether the client has overused the hardware device. When the client has overused the hardware device subsequent IO jobs received from the client can be stored in the queue until the client is allocated more time using techniques described in U.S. application Ser. No. 12/242,624 entitled "BALANCING USAGE OF HARDWARE DEVICES AMONG CLIENTS."

Figure 11:
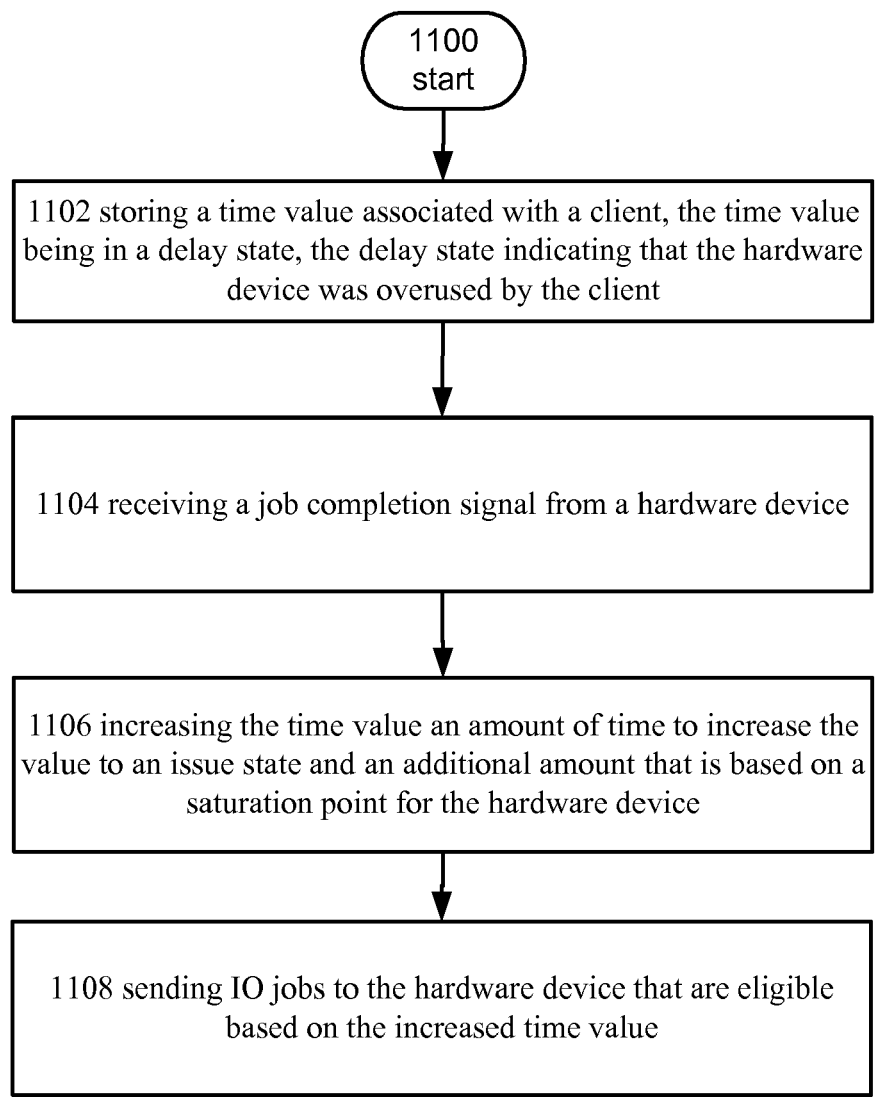
FIG. 11 illustrates an operational procedure for practicing aspects of the present disclosure.

Referring now to FIG. 11, it illustrates an operational procedure for practicing aspects of the present disclosure including operations 1100-1110. Similar to that described above, operation 1100 begins the operational procedure and operation 1102 depicts storing a time value associated with a client, the time value being in a delay state, the delay state indicating that the hardware device was overused by the client. For example, and referring to FIG. 4 for illustration purposes, in an embodiment a time value can be stored in memory accessible to a balancer 226 such as RAM or a cache built into the hardware device and the value can indicate that the hardware device was overused by the client by an amount of time. Or put another way, the time value can be indicative of an estimated amount of time that the hardware device spent completing IO jobs from the clients that was over an amount of time that was allocated to it. Similar to that described above, the balancer 226 can estimate how long it will take the hardware device to complete the jobs based on factors such as the operating characteristics of the hardware device, number of bytes in the request, the type of request, e.g., read or write, overhead associated with processing any request, whether the request involves a flow switch or is in non-sequential order (in the storage device example), etc. In other example embodiments the estimation can be obtained using techniques described in U.S. patent application Ser. No. 12/242,621 entitled "HARDWARE THROUGHPUT SATURATION DETECTION." In a specific example, and referring to FIG. 4, values that indicate that client 3 and client 4 have overused the hardware device can be stored in memory. In this example, the values can identify how much estimated time each client overused the device.

Continuing with the description of FIG. 11, operation 1104 shows receiving a job completion signal from a hardware device. For example, in an embodiment a IO job completion signal can be received from the hardware device, e.g., a signal that indicates a job or jobs is or are finished, and the balancer 226 can be run, e.g., the processor 212 can execute the instructions indicative of the balancer 226. The balancer 226 in this example can determine the estimated amount of time that it will take for the hardware device to complete the jobs that are currently pending in the hardware device (the in-flight IO jobs) and compare the value to a saturation point.

Continuing with the description of FIG. 11, operation 1106 shows increasing the time value an amount of time to increase the value to an issue state and an additional amount that is based on a saturation point for the hardware device. For example, in an embodiment of the present disclosure the time amount can be increased by an amount of time that will increase the time value to a point that indicates that the client is eligible to send IO jobs to the hardware. For example, if the value is −25 ms the balancer 226 can be executed and at least 25 ms can be added to the value (in this example 0 can be considered a value that is eligible to send IO jobs to the hardware.) In another example an issue line can be advanced an amount to make the issue point associated with, for example, client 3 of FIG. 4 0 or greater using techniques described above and in U.S. application Ser. No. 12/242,624 entitled "BALANCING USAGE OF HARDWARE DEVICES AMONG CLIENTS." In addition the balancer 226 can add an additional amount of time to all pending 10 flows that is based on the saturation point of the hardware device. For example, in embodiments each time the balancer 226 increments time for a flow CPU overhead is incurred, e.g., processing time associated with adding time and identifying flows that can be issued. In this embodiment the processor can used to identify the next flow to send IO jobs from and add an amount that could potentially make another flow eligible. In this example multiple flows can become eligible with a single operation thereby increasing processor efficiency. In this example the additional amount can be set as a factor of the saturation point in order to coincide with the timing techniques described above with respect to FIG. 5, for example 0.2* the numeric value of the saturation point.

Continuing with the description of FIG. 11, operation 1108 shows sending IO jobs to the hardware device that are eligible based on the increased time value. For example, the IO jobs that are eligible based on the increased time value can be sent to the hardware device. In one embodiment this can include sending all the IO jobs that have positive or 0 values. In an implementation where the balancer 226 is located in the root, sending the IO jobs to the hardware device can include, but is not limited to sending, the IO jobs to the driver associated with the hardware device. In an alternative embodiment, one in which the balancer 226 is code of the driver sending the IO jobs to the hardware device can include, but is not limited to sending the IO jobs to the hardware device itself. In yet another example, one in which the balancer 226 is embedded in the firmware of the hardware device for example, sending the IO jobs to the hardware device can include, but is not limited to sending the IO jobs to other code or circuits of the hardware device.

Figure 12:
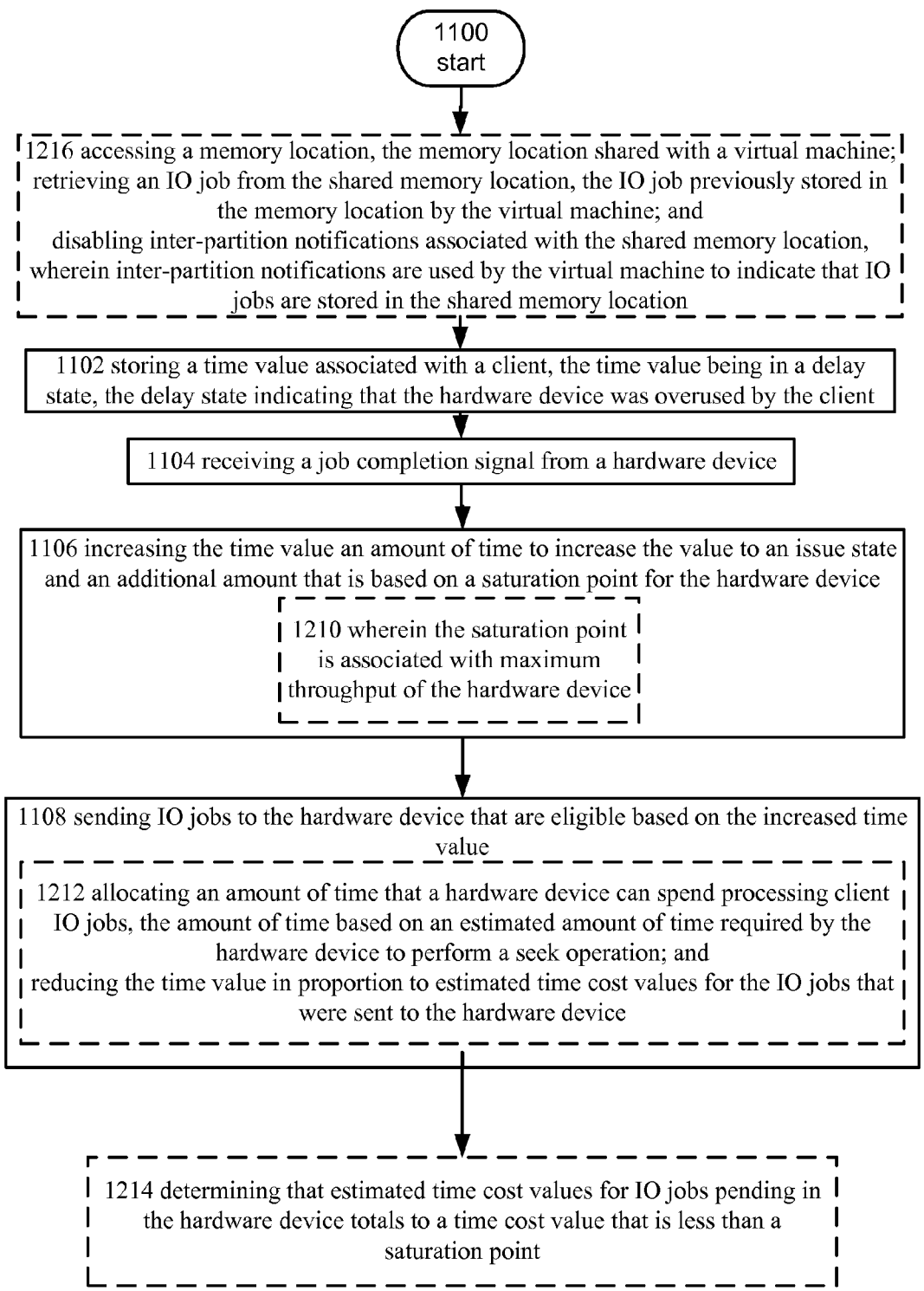
FIG. 12 depicts an alternative embodiment of the operational procedure of FIG. 11.

Referring now to FIG. 12, it depicts an alternative embodiment of the operational procedure of FIG. 11 including the additional operations 1210, 1212, 1214, 1216 and 1218. As is illustrated by FIG. 12, operation 1210 shows wherein the saturation point is associated with maximum throughput of the hardware device. For example, in an embodiment the saturation point can be set to the minimum amount of IO time cost in flight that still achieves maximum throughput of the hardware device. In this example embodiment empirical studies of hardware devices can be conducted an the total time cost of IO jobs can be calculate that fully maximizes the throughput of the hardware device. In this example the addition of any more time cost to the hardware device would not increase the rate at which the hardware device can complete IO jobs.

Continuing with the description of FIG. 12, operation 1212 shows allocating an amount of time that a hardware device can spend processing client IO jobs, the amount of time based on an estimated amount of time required by the hardware device to perform a seek operation; and reducing the time value in proportion to estimated time cost values for the IO jobs that were sent to the hardware device. In an example embodiment the balancer 226 can be executed by the processor 212 and the processor 212 can allocate a quantum sized amount of time to a client similar to that describe above with respect to operation 704. The quantum sized amount can be an amount of time that is large enough to minimize the overhead associated with seeking from one area of a hard drive to another. That is, by assigning each client a 'chunk' of time that is larger than an acceptable throughput loss, the cost of a seek can be amortized over more IO jobs. For example, in an embodiment the balancer 226 can estimate how long it will take the hardware device to complete the jobs based on factors such as the operating characteristics of the hardware device, number of bytes in the request, the type of request, e.g., read or write, overhead associated with processing any request, whether the request involves a flow switch or is in non-sequential order (in the storage device example), etc. In other example embodiments the estimation can be obtained using techniques described in U.S. application Ser. No. 12/242,621 entitled "HARDWARE THROUGHPUT SATURATION DETECTION." Once the estimate for each IO job is obtained, the allocated quantum can be reduced in proportion to the estimates.

In this example a client's flow may be made eligible based on the addition of the amount of time based on the saturation period. For example, the value associated with this client may be 10 ms. In this example a quantum sized amount of time, e.g., 62.5 ms can be allocated to the client and the value associated with the client's flow can be reduced to −52.5 ms. In this example the IO jobs can be sent and the client's IO jobs may be delayed until the value becomes 0 or positive again.

In an alternative embodiment, one including an issue line such as is described in U.S. application Ser. No. 12/242,624 entitled "BALANCING USAGE OF HARDWARE DEVICES AMONG CLIENTS," the issue line can be advanced an amount based on the saturation point of the hardware device thereby adding more time to each client's flow. In this example the client's flow can be reduced by a quantum sized amount and the quantum can be stored in a memory location. IO jobs that are queued can then be issued and the allocated quantum amount can be reduced. If the remaining quantum value associated with a client is still positive, any subsequent IO jobs that are received can be issued to the hardware device even when the value indicates that the hardware has been overused by the client. In this implementation the overuse is acceptable because the client will pay back the over-use before another quantum is granted and the cost of switching flows, e.g., seeking to another area of the hard drive, is greater than an acceptable amount of throughput loss.

Continuing with the description of FIG. 12, operation 1214 shows determining that estimated time cost values for IO jobs pending in the hardware device totals to a time cost value that is less than a saturation point. For example, in an example embodiment the processor 212 can execute the balancer instructions and determine that the time cost for the IO jobs that are currently pending in the hardware device total to a value that is less than the saturation point. For example, in this example embodiment each IO job received from a client such as a virtual machine can be analyzed and the processor 212 can run the balancer instructions to determine an estimated time cost associated with IO jobs that are pending in the hardware device is less than a saturation point value using techniques described in commonly owned U.S. patent application Ser. No. 12/242,621 entitled "HARDWARE THROUGHPUT SATURATION DETECTION."

Continuing with the description of FIG. 12, operation 1214 shows accessing a memory location, the memory location shared with a virtual machine; retrieving an IO job from the shared memory location, the IO job previously stored in the memory location by the virtual machine; and disabling inter-partition notifications associated with the shared memory location, wherein inter-partition notifications are used by the virtual machine to indicate that IO jobs are stored in the shared memory location. In an example embodiment inter-partition interrupts can be disabled when, for example, the saturation point has been reached. In virtual machine implementations a shared memory location such as a ring buffer may be used by a virtual machine, such as virtual machine 216 to send messages to the virtualization service provider 228. In an implementation the inter-partition notification can be disabled until the total time cost of the IO jobs that are pending in the hardware device falls below the saturation point. When the total time cost of pending IO jobs falls below the saturation point the notification can be enabled and the notification interrupt can occur. In this example the processor 212 may execute an interrupt handler and execute the balancer code. The processor 212 can then access the shared memory location and retrieve the IO jobs. In this example the processor 212 can then disable the inter-partition notifications and send and/or delay IO jobs. In an alternative implementation when the total time cost of pending IO jobs falls below the saturation point the processor 212 can be configured to poll the shared memory location in order to retrieve IO jobs. In this example the processor 212 can then re-enable inter-partition notifications if the time cost of pending IO jobs drops below the lower saturation point or keep the inter-partition notifications disabled.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. An IO job batching method, comprising:
 determining a saturation point of a hardware device;
 estimating a time cost for IO jobs pending in the hardware device and determining that the estimated time cost total to a time cost value that is less than the saturation point; and
 sending an amount of IO jobs to the hardware device, the amount of IO jobs increasing the estimated time cost for pending IO jobs past at least the saturation point.

2. The method of claim 1, wherein the amount of IO jobs sent to the hardware device increases the estimated time cost for IO jobs pending in the hardware device past an upper saturation point.

3. The method of claim 1, further comprising:
 determining that the estimated time cost for IO jobs pending in the hardware device is greater than the saturation point; and
 delaying IO jobs.

4. The method of claim 1, further comprising:
 determining that the estimated time cost for IO jobs pending in the hardware is lower than a lower saturation point; and
 sending subsequent IO jobs to the hardware device upon receipt of the subsequent IO jobs.

5. The method of claim 1, wherein the saturation point is associated with maximum throughput of the hardware device.

6. The method of claim 1, wherein the saturation point is set based on an estimated time cost of an average IO job.

7. The method of claim 1, wherein the saturation point is dynamically determined based on operational characteristics of the hardware device.

8. The method of claim 1, further comprising:
 accessing a memory location, the memory location shared with a virtual machine;
 retrieving an IO job from the shared memory location, the IO job previously stored in the memory location by the virtual machine; and
 disabling inter-partition notifications associated with the shared memory location, wherein inter-partition notifications are used by the virtual machine to indicate that IO jobs are stored in the shared memory location.

9. A computer readable storage medium including computer executable instructions for batching IO jobs, the computer readable storage medium comprising:
 instructions for receiving IO jobs associated with a client;
 instructions for allocating a quantum amount of time that a hardware device can spend processing client IO jobs, the quantum amount of time based on an estimated amount of time required by the hardware device to perform a seek operation; and
 instructions for sending client IO jobs to the hardware device, the amount of client IO jobs having an estimated time cost equal to or less than the allocated quantum amount of time.

10. The computer readable storage medium of claim 9, further comprising:
 instructions for reducing the allocated quantum amount of time in proportion to an estimated time cost for the client IO jobs sent to the hardware.

11. The computer readable storage medium of claim 9, further comprising:
 instructions for determining that estimated time cost for IO jobs pending in the hardware device totals to a time cost value that is less than a saturation point.

12. The computer readable storage medium of claim 9, further comprising:
 instructions for accessing a memory location, the memory location shared with a virtual machine;
 instructions for retrieving an IO job from the shared memory location, the IO job previously stored in the memory location by the virtual machine; and
 instructions for disabling inter-partition notifications associated with the shared memory location, wherein inter-partition notifications are used by the virtual machine to indicate that IO jobs are stored in the shared memory location.

13. The computer readable storage medium of claim 9, further comprising:
 instructions for associating the client with a total amount of time that the hardware device can spend processing client IO jobs.

14. The computer readable storage medium of claim 13, further comprising:
 instructions for allocating the quantum amount of time that the hardware device can spend processing client IO jobs from the total amount of time.

15. The computer readable storage medium of claim 14, further comprising:
 instructions for reducing the total amount of time that the hardware device can spend processing client IO jobs; and
 instructions for storing subsequent client IO jobs in a queue.

16. A computer system configured to batch IO jobs, the computer system comprising:
 circuitry for storing a time value associated with a client, the time value being in a delay state, the delay state indicating that the hardware device was overused by the client;
 circuitry for receiving a job completion signal from a hardware device;
 circuitry for increasing the time value an amount of time to increase the value to an issue state and an additional amount that is based on a saturation point for the hardware device; and
 circuitry for sending IO jobs to the hardware device that are eligible based on the increased time value.

17. The computer system of claim 16, wherein the saturation point is associated with maximum throughput of the hardware device.

18. The computer system of claim 16, wherein sending IO jobs to the hardware device that are eligible further comprises:
 circuitry for allocating an amount of time that a hardware device can spend processing client IO jobs, the amount of time based on an estimated amount of time required by the hardware device to perform a seek operation; and
 circuitry for reducing the time value in proportion to estimated time cost values for the IO jobs that were sent to the hardware device.

19. The computer system of claim 16, further comprising:
 circuitry for determining that estimated time cost values for IO jobs pending in the hardware device totals to a time cost value that is less than a saturation point.

20. The computer system of claim 16, further comprising:
 circuitry for accessing a memory location, the memory location shared with a virtual machine;
 circuitry for retrieving an IO job from the shared memory location, the IO job previously stored in the memory location by the virtual machine; and
 circuitry for disabling inter-partition notifications associated with the shared memory location, wherein inter-partition notifications are used by the virtual machine to indicate that IO jobs are stored in the shared memory location.

* * * * *